Patented Jan. 15, 1924.

1,480,640

UNITED STATES PATENT OFFICE.

FRITZ STRAUB AND RICHARD SALLMANN, OF BASEL, SWITZERLAND, ASSIGNORS TO SOCIETY OF CHEMICAL INDUSTRY IN BASLE, OF BASEL, SWITZERLAND.

MANUFACTURE OF CHROMIUM COMPOUNDS OF AZO DYESTUFFS.

No Drawing. Application filed February 27, 1922. Serial No. 539,739.

*To all whom it may concern:*

Be it known that we, FRITZ STRAUB and RICHARD SALLMANN, both citizens of the Swiss Republic, and residents of Basel, Switzerland, have invented new and useful Improvements in the Manufacture of Chromium Compounds of Azo Dyestuffs, of which the following is a full, clear, and exact specification.

In the specifications of the United States Patent No. 1,221,849, and of patent application Ser. No. 453,430 is described the manufacture of chromium compounds of azo-dyestuffs containing groups capable of being chromed by treating the dyestuffs either with alkali compounds of the trivalent chromium hydroxide $Cr(OH)_3$, or with the complex compounds obtained by causing chromium hydroxide in presence of an alkali to act on organic compounds containing more than one hydroxyl group.

By the present invention these chromium compounds of dyestuffs may be made in a very advantageous manner by uniting in a single operation the manufacture of the dyestuff and that of its chromium derivative, namely by preparing the azo-dyestuff in presence of one or other of the chroming agents of the aforesaid specifications and then heating the product until the dyestuff formed has been completely converted into its chromium compound.

The following examples illustrate the invention, the parts being by weight:—

Example 1.

41 parts of caustic soda are dissolved in a mixture of 10.3 parts of chromium hydroxide, freshly precipitated, and 70 parts of water heated to 60–70° C. and contained in an iron boiler having a stirrer; there are added to the mixture 15 parts of β-naphthol and the whole is cooled to 15° C. 27.3 parts of the diazo-compound of 1-amino-2-oxy-naphthalene-4-sulfonic acid are now introduced and the mixture is heated to 40° C. and kept at this temperature until the diazo-compound has disappeared. The temperature is now raised to and kept at 70–75° C. until the dyestuff has been completely transformed into its chromium compound. The mixture is then strongly diluted with water, the excess of caustic alkali is neutralized with a mineral acid and the dyestuff is precipitated by means of common salt. It dyes wool blue.

Example 2.

20 parts of 3-amino-4-cresol-6-sulfonic acid are diazotized in as small as possible a quantity of water and the diazotized solution thus obtained is introduced into a mixture of 11.6 parts of chromium hydroxide, 57 parts of caustic potash, 14.7 parts of β-naphthol and 51 parts of water, prepared as described in the preceding example and cooled to 5° C. When the diazo-compound has disappeared the mixture is slightly heated and there are added 28 parts of caustic potash; the whole is then heated at 75° C. until the dyestuff is completely transformed into its chromium compound which may be the case after some hours. Dilution with water follows, the excess of caustic alkali is neutralized with a mineral acid and the dyestuff is precipitated by means of common salt. It dyes wool violet.

Example 3.

11 parts of caustic potash are dissolved in a mixture heated to 60–70° C. of 5.2 parts of freshly precipitated chromium hydroxide and 25 parts of water. 5.6 parts of glycerine are then added and the whole is boiled until complete solution has occurred. After dilution with about 3 parts of water 8.6 parts of 1-phenyl-3-methyl-5-pyrazolone are added. The mixture is cooled to 5°. 13.6 parts of the diazo-compound of 1-amino-2-oxy-naphthalene-4-sulfonic acid are introduced and the whole is stirred until the diazo-compound has disappeared. The mixture is now boiled in a reflux apparatus until the dyestuff is completely transformed into its chromium compound. The mixture is then diluted with a little water, the excess of caustic alkali is neutralized with a mineral acid and the dyestuff is precipitated by means of common salt. It dyes wool bluish-red.

What we claim is:—

The herein described manufacture of chromium compounds of azo-dyestuffs containing groups capable of being chromed, consisting in uniting in a single operation the manufacture of the dyestuff and that of its chromium compound by preparing the azo-dyestuff in presence of alkali compounds of the trivalent chromium hydroxide $Cr(OH)_3$, and then heating the product of the reaction until the dyestuff is completely converted into its chromium compound.

In witness whereof we have hereunto signed our names this 15th day of February, 1922, in the presence of two subscribing witnesses.

FRITZ STRAUB.
RICHARD SALLMANN.

Witnesses:
 FRIDA KURZ,
 AMAND FRAME.